United States Patent
Gibbs et al.

(10) Patent No.: US 6,711,182 B1
(45) Date of Patent: Mar. 23, 2004

(54) METHOD AND APPARATUS FOR PROCESSING DATA FROM MULTIPLE SOURCES

(75) Inventors: Jonathan A. Gibbs, South Hampton (GB); Timor Kadir, East Sussex (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/214,285

(22) PCT Filed: Apr. 30, 1998

(86) PCT No.: PCT/EP98/02592

§ 371 (c)(1),
(2), (4) Date: Apr. 26, 1999

(87) PCT Pub. No.: WO98/51028

PCT Pub. Date: Nov. 12, 1998

(30) Foreign Application Priority Data

May 2, 1997 (GB) .............................. 9709100

(51) Int. Cl.$^7$ ................................. H04J 3/02
(52) U.S. Cl. ................. 370/537; 370/464; 370/395.42; 709/207
(58) Field of Search ............................... 370/537, 538, 370/539, 238, 474, 464, 905, 229, 230, 232, 235, 252, 395.42, 395.43, 395.52, 444, 462; 709/200, 201, 207, 230, 231, 236, 238

(56) References Cited

U.S. PATENT DOCUMENTS

| | | | | |
|---|---|---|---|---|
| 5,251,209 A | | 10/1993 | Jurkevich et al. ............. 370/82 |
| 5,280,479 A | * | 1/1994 | Mary ........................ 370/85.6 |
| 5,465,267 A | * | 11/1995 | Todoroki .................... 375/279 |
| 5,506,903 A | * | 4/1996 | Yamashita .................. 380/216 |
| 5,541,919 A | * | 7/1996 | Yong et al. ................. 370/416 |
| 5,563,884 A | * | 10/1996 | Fimoff et al. ............... 370/391 |
| 5,671,226 A | * | 9/1997 | Murakami et al. ........... 370/474 |
| 5,835,498 A | * | 11/1998 | Kim et al. .................. 370/537 |
| 5,946,309 A | * | 8/1999 | Westberg et al. ............ 370/395 |
| 5,987,518 A | * | 11/1999 | Gotwald ..................... 709/230 |
| 5,991,313 A | * | 11/1999 | Tanaka et al. .............. 370/537 |
| 6,157,674 A | * | 12/2000 | Oda et al. ................... 375/240 |
| 6,487,220 B2 | * | 11/2002 | Matsuzaki et al. .......... 370/487 |
| 6,522,672 B1 | * | 2/2003 | Matsuzaki et al. .......... 370/539 |

FOREIGN PATENT DOCUMENTS

| EP | 035230 A2 | * | 9/1981 | ............ H04B/7/15 |
|---|---|---|---|---|
| EP | 0171596 A2 | | 2/1986 | |
| EP | 676875 A | * | 10/1995 | ............. H04L/1/00 |

* cited by examiner

Primary Examiner—Dang Ton
Assistant Examiner—Tri H. Phan
(74) Attorney, Agent, or Firm—Kenneth A. Haas

(57) ABSTRACT

The invention encompasses a method of preparing data for transmission, which method comprises: multiplexing data from a plurality of sources (S1, ... Si, ... Sn), the multiplexing comprising, for at least one source (Si), classifying the data from the source (Si) into two or more classes (C1,f.Cj, ... Cm) according to the data's priority, and mapping data from the sources into positions in a data structure (D) according both to the class (Cj) of the data and to a further priority assigned to the source (Si) from which the data originated, the division of data into classes (C1, ... Cj, ... Cm) and/or the prioritization of the sources (S1, ... Si, ... Sn) being done according to the potential impact of transmission errors on the data; and sub-dividing the data in the data structure (D) into frames while preserving the relative prioritization of the data. The sources may be various multi-media sources. Also disclosed are a method of forward error correction (FEC) encoding the multiplexed data for transmission while maintaining the data's relative prioritization, and a method for decoding and de-multiplexing data. Apparatus for implementing these methods is also disclosed.

9 Claims, 4 Drawing Sheets

METHOD AND APPARATUS FOR PROCESSING DATA FROM MULTIPLE SOURCES

TECHNICAL FIELD

This invention relates generally to the multiplexing, encoding and transmission of data. More particularly, the invention concerns the transmission of data originating from a plurality of sources. These can be multi-media sources.

BACKGROUND

Examples of single media services are speech and data. For such single media services, forward error correction (henceforth FEC) schemes are used, and are developed on a case by case basis. FEC uses redundancy to allow the receiver of a corrupted digital signal to determine the actual signal sent. FEC thus mitigates against data corruption arising due to error prone transmission paths.

In the case of speech, the development of an FEC scheme usually involves creating a different FEC scheme for each and every system, taking into account the different impact of bit-errors during transmission on different parameters of the bit stream. This means that in order to introduce a new speech codec into a system, it is almost always necessary to redesign the FEC too.

In designing an FEC scheme for a particular type of media transmission e.g. speech or video, it is desirable to employ some type of joint source/channel or unequal protection coding technique to allow greater protection for the more important segments of the data stream, whilst some of the bits may not receive any FEC protection at all.

Such differing requirements on the FEC protection of certain parameters or bits are a known characteristic of low bit-rate source coders for a single source, i.e. which act on one particular type of media transmission. For example in the context of video coding, an error in the motion vectors would cause a greater perceived degradation than an error in the DCT (Discrete Cosine Transform) coefficients. This requirement implies that the FEC is applied with detailed knowledge of the source coding algorithm.

Current mobile system FEC schemes for single services, e.g. speech, almost invariably make use of Rate Compatible Punctured Convolutional (henceforth RCPC) Coding in order to provide differential error protection for the different bits of the coder bit stream. See for example the prior art publication Hagenauer, "Rate-Compatible Punctured Convolutional Codes (RCPC Codes) and their Applications", IEEE Trans Comms, Vol. COM-36, No. 4, April 1988. However, in such single service applications, the number of bits protected is usually fixed, as are the positions in the FEC frames of the different parameters. Alternatively, in the case of variable bit-rate sources, the encoding rules are selected from a limited number of possibilities.

Further considering mobile systems, the current approach to designing FEC schemes for these systems is to develop them for single services, i.e. speech only. Although the performance of such FEC schemes is near optimal for such single services, adopting a similar approach to multi-media would lead to a potential mismatch in the error performance of the different services and potentially a waste of channel resource.

In a multi-media environment it is usually necessary to multiplex bit streams from multiple sources, such as video, audio and data, into a single bit stream. There are a number of standards that define methods of achieving this, such as ITU-T Recommendation H.223 "Line Transmission of Non-Telephone Signals—Multiplexing protocol for Low Bit Rate Multimedia Communication".

Conventional designs for multi-media services make use of different FEC schemes for each of the individual services, which are then multiplexed. Additional error protection is then required in order to protect the multiplexing information. This is a complex and inflexible arrangement.

With such a design philosophy, it is also very difficult to ensure that the services have similar quality vs channel bit error rate (BER) profiles, particularly if new service components, e.g. a new speech codec, are added. Hence, it is likely that the relative robustness of the multiple service components will be different leading to degradations in quality of those components occurring at different rates and at different locations in the coverage area. In practical terms a mobile user located for instance at the edge of a coverage area or in a geographical depression might suffer excessive degradation of some of the multi-media services which it receives before others. This is clearly undesirable, particularly if one of the more important of the service components in a particular application, such as text or pictures, degrades faster than another of lesser importance, such as sound.

In multi-media data transmission, and particularly for future mobile systems, it seems likely that service providers and network operators will wish to introduce new services quickly and easily. In a multi-media context this may involve putting together different audio, speech and video codecs in order to fulfill particular market niches. Such niches are also likely to demand very different requirements in terms of quality for the different components of the multi-media service.

Published European Patent Application EP-A-0171596 provides a signal-concentrator arrangement. A plurality of user channels are concentrated onto a common communication channel. To do this, information from each user channel is buffered, prioritised and transferred to the common communication channel based on this prioritisation. The priority assigned to the information depends its type, e.g. data has a higher priority than voice packets. In order to maintain the delay associated with normal speech, some voice packets from a particular source may be given a different priority than other voice packets from a different source.

Published U.S. Pat. No. 5,280,479 shows a multiplexing device for the insertion of digital packets, supplied by several different sources, into the same transmission channel. Each source generates an insertion priority order for each packet as a function of the type of packet. A particular source may have a different priority to other, similar sources, for example based on the number of packets which it is storing awaiting transmission.

SUMMARY OF THE INVENTION

According to the invention, a method of preparing data from multiple sources for transmission comprises: multiplexing data from a plurality of sources, the multiplexing comprising, for at least one source, classifying the data from the source into two or more classes according to the data's priority, and mapping data from the sources into positions in a data structure according both to the class of the data and to a further priority assigned to the source from which the data originated; and sub-dividing the data in the data structure into frames whilst preserving the relative prioritisation of the data.

Where the data from a second or further sources is classified into multiple classes, these classes are not necessarily identical to those used for the first said source, i.e. the particular classes used are specific to the source concerned.

A method of encoding data for transmission incorporating this method of preparing data is also provided. The method of encoding data for transmission comprises preparing data from a plurality of sources in accordance with the method of preparing given above, and performing forward error correction (FEC) encoding on the data frames whilst preserving the relative prioritisation of the data.

The division of data into classes and/or the prioritisation of the sources can be done according respectively to the importance of the data and the importance of the source to the data's recipient(s).

Alternatively, the division of data into classes and/or the prioritisation of the sources can be done according to the potential impact of transmission errors on the data.

A method of decoding and de-multiplexing data is also provided.

The method of decoding and de-multiplexing data which has been encoded in accordance with the method of encoding given above involves the data firstly being decoded into frames, then the data frames being re-constituted into a data structure, and finally the data being de-multiplexed back to the format of the sources from which it originated.

The invention also encompasses apparatus adapted to perform any of the methods given above.

The invention facilitates data transmission to or from a multimedia terminal, which may be mobile. The processing of the data for this transmission involves multiplexing the data whilst taking into account the two priorities described above, dividing the data structure thus created into frames, and finally encoding the data, preferably using an RCPC forward error correction scheme.

The invention provides several advantages. Principally the system allows a wide choice of input sources and codecs, without requiring a major re-design of the system when a new codec is added or one omitted. Thus codecs can be treated simply as "modular" blocks.

For the encoding of data prior to transmission, since a single FEC encoder and decoder design is used for all services and all logical channels, it is simpler to add new codecs and new service options without the need to redesign the FEC protection of either the existing codecs or the new codec in order to balance performance.

This invention provides flexibility to change the FEC rate for each logical channel, i.e. source, of a multi-media call, allowing the FEC protection trade-off between the different services of a multi-media transmission to be modified. This can even take place during the call(s). Both the relative priorities of the sources and the priorities of the different classes of data from each particular source can be chosen at will.

DETAILED DESCRIPTION OF THE PREFERRED EMBODIMENT

In its most general form, the invention concerns the preparation for transmission of data from several sources. The data from within one source can be assigned different priorities, as can the sources themselves. The data output by each source constitutes one "logical channel" whose data must be multiplexed and divided into frames in preparation for transmission.

The preferred embodiment of the invention illustrated shows a method and apparatus for preparing data in accordance with the above scheme, together with forward error correction of the data and finally transmission of the data to a recipient. In its most complete form, the invention takes data from multiple sources and optimises the processing of the data for transmission. This preparation and the encoding which this encompasses are critical to maximising the usefulness of the data to a recipient, which may be separated from the transmitting user by a transmission path which induces errors in the received data. Both the nature of the errors and their frequency of occurrence may vary with time.

The embodiment of the invention chosen for illustration in the figures receives data from multiple sources. The sources may have different data rates and formats, and each source may provide data of differing importance to the recipient of the transmission. As an example, a source such as a video codec might produce larger frames of data than for instance an audio codec, but produce fewer such frames per second.

Figure 1:
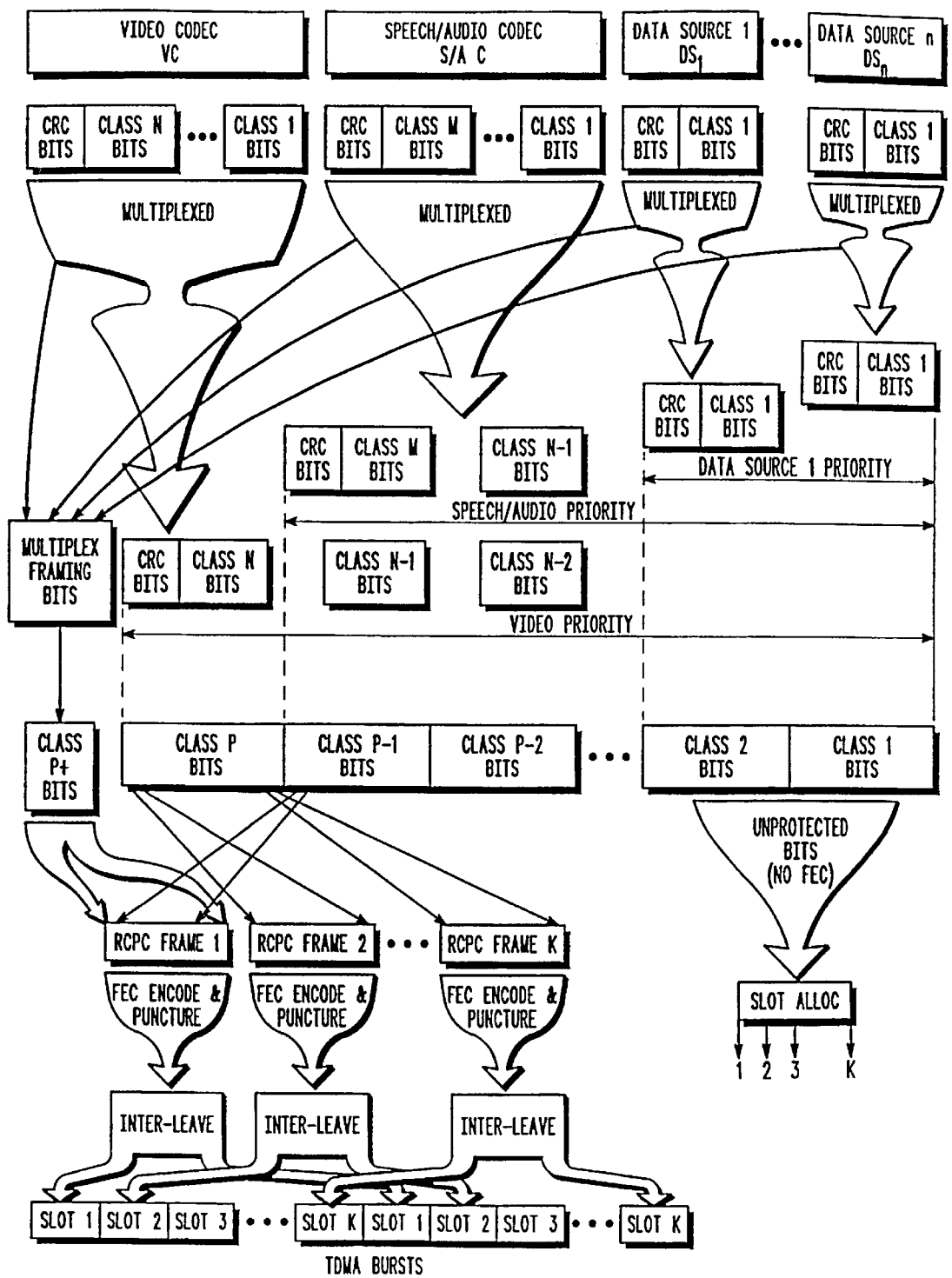
FIG. 1 shows an embodiment of the present invention whereby data from multiple sources is multiplexed, prepared and encoded for TDMA transmission.

The method of the invention is shown in FIG. 1. The sources of data can have various forms. The illustrated sources are a video codec (VC), a Speech/Audio codec (S/A C), and data sources (DS1 . . . DSn). There may be more or fewer video codec and/or audio codec sources than illustrated, and there may be up to n data sources of the generalised type DS. These sources may be part of a mobile multi-media terminal, or terminals, or may provide data for transmission to such terminals. This embodiment also comprises an FEC framework for the mobile multimedia system. In this case, RCPC techniques have been illustrated. The invention may be implemented as an extension to an existing simple multiplexing scheme, such as that known from H.223.

Considering in detail FIG. 1:

(i) The uppermost row of the figure represents the sources of data VC, S/A C, DS1 . . . DSn . . .

(ii) The second row shows the data from each source, which has been divided up into classes. These run for instance from class N to class 1 for the video codec, with the CRC bits being in a separate class.

The prioritisation of bits from one source into classes is itself known in the prior art for an individual low bit rate speech codec serving only one source. The bit-stream of an individual channel is in most cases divided into units relating to some logical structure of the source coding algorithm such as a speech frame or video frame. This applies to both the prior art arrangement for a single individual channel, and for each channel of the present invention.

(iii) The third row shows broad arrows representing the step of multiplexing the data into the single data structure, which data structure D consists of data in classes varying from P+, P, P−1 through to 1 and which is shown in the fourth row of the figure. An illustration of the relative priority of each source is shown superimposed on this section of the figure, with the distance from the right edge of the figure indicating the priority. For instance, the "VIDEO PRIORITY" is greater than the "DATA SOURCE 1 PRIORITY".

Figure 2:
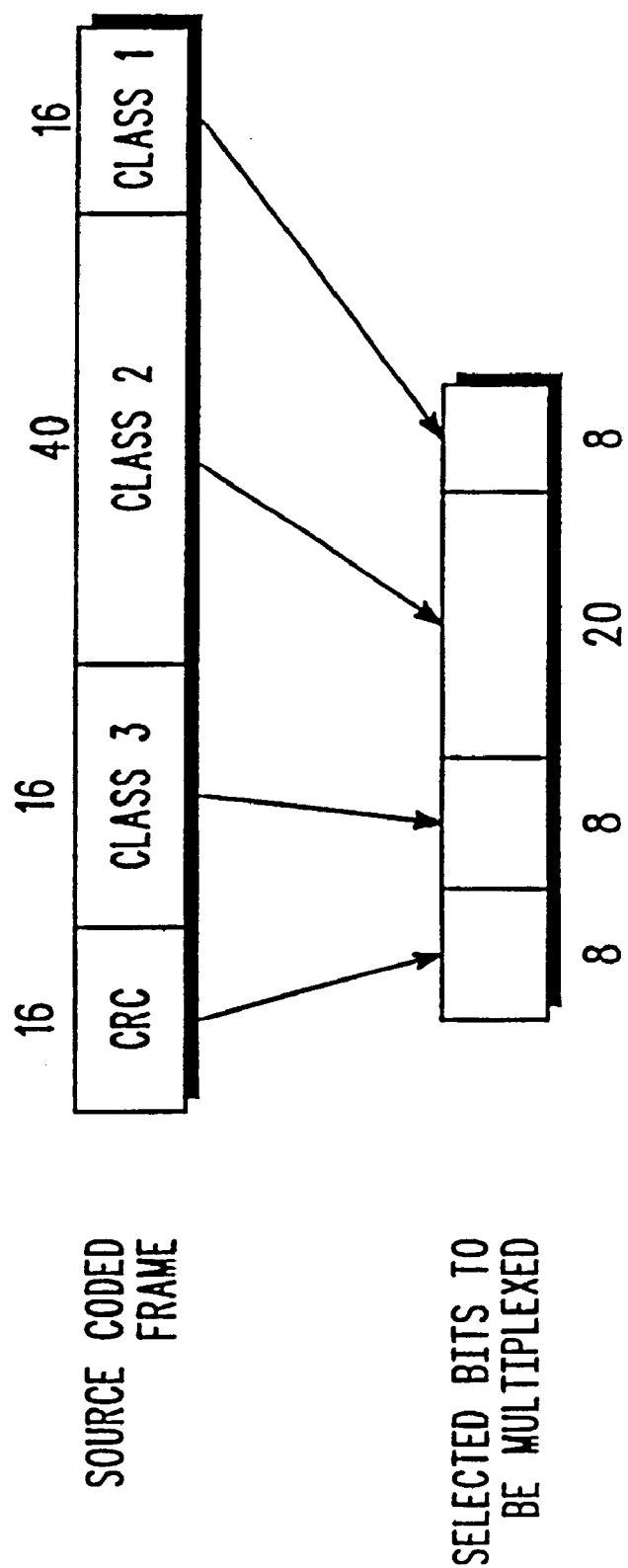
FIG. 2 shows a selection of bits from one of the sources, whereby an equal proportion of each class of bit is taken.

The arrow directly under the Speech/Audio codec shows no constriction to its width. This indicates that the Speech/Audio codec is the rate determining source. In practical terms this means that only a proportion of the data from the other sources is taken and used for each data structure created. Only from the Speech/Audio codec is the entire unit of data produced by the source incorporated in one data structure, e.g. data from the whole speech frame. The selection of a proportion of the data from each source other than the rate determining source is illustrated in FIG. 2, and will be discussed in more detail in connection with that figure. The rate determining source may be chosen in a variety of ways. For example, it may be the source which supports the service whose delivery would be most disadvantaged by timing jitter during transmission.

(iv) The fourth row of the figure shows the data structure D which results from the multiplexing step.

(v) The fifth row of the figure shows the RCPC frames into which the data from the data structure D has been divided. This division is such as to retain the relative priority which the data had in the data structure.

(vi) The sixth row of the figure uses arrows to illustrate the encoding and puncturing of the data from the RCPC frames, and the interleaving of the resulting data into slots for transmission, which are themselves illustrated in the seventh and final row of the figure.

(vii) The seventh row of the figure shows the data in slots for transmission, here as TDMA bursts.

Prior art FEC schemes for multiple sources are designed to perform FEC encoding on each source prior to multiplexing. At the multiplexing stage, each service or logical channel has a fixed importance in relation to others. As opposed to this, the embodiment of the invention allocates a relative priority to each logical channel (and hence its associated service) and performs multiplexing prior to FEC encoding. The relative priority may be assigned during the call set-up time. The priority information should be included in the channel definition table and may be dynamically altered during the call.

According to the invention, each logical channel has a defined number of priority classes with a known number of bits in each class, into which the respective parts of its bit stream are arranged. The multiplex layer will then select a proportion of bits from each class from each logical channel. This selection is shown in more detail in FIG. 2.

Considering in detail FIG. 2:

(i) In the upper part of the figure, a frame of data from one of the sources is shown, with the data divided into classes. The numbers 16,16,40 and 16 represent the number of bits in the classes of data immediately below each of these numbers.

(ii) The lower part of the figure shows the selection of bits taken for multiplexing from the classes. In this example the selection of bits contains half as many bits as were present in the single original data frame. The number of bits taken from each class of the original frame is shown by the numbers 8,8,20 and 8 below the selection. The remainder of the data in the single frame shown at the top of the figure will be multiplexed subsequently into a later data structure, or structures.

According to the invention, the number of bits selected from each class is defined by the size of the output data unit of the multiplex. The size of this is specific to the particular type and implementation of the multiplex, but is usually constrained by logical channels whose output frames cannot be segmented across multiple output data units, and also by the physical channel data rate.

In conventional multiplex schemes the bits are usually selected from the input data units in a sequential manner. However in the present invention the bits for each class $C_j$ are chosen in such a way as to result in a data unit where there is an equal proportion of each class of bit as in the input data frame from the particular source. See again FIG. 2. Another way of explaining this would be to consider each class within a logical channel as a virtual sub-channel with its own data rate and protection.

The resulting classes from all the logical channels are then arranged in a global priority order, thereby creating a data structure (D). This global priority is derived from the relative priorities of the logical channels and the priority of the classes within each channel. The data structure D is shown in FIG. 1 as the fourth row of the figure, and consists of data classes P+, P, P−1 . . . 1.

There are a number of ways of using, i.e. combining together, the priority of a particular class within its channel and the priority of that channel relative to the other channels. Two ways of performing this mapping of the channel classes into an overall ordering are shown in FIGS. 3A and 3B.

Figure 3A:
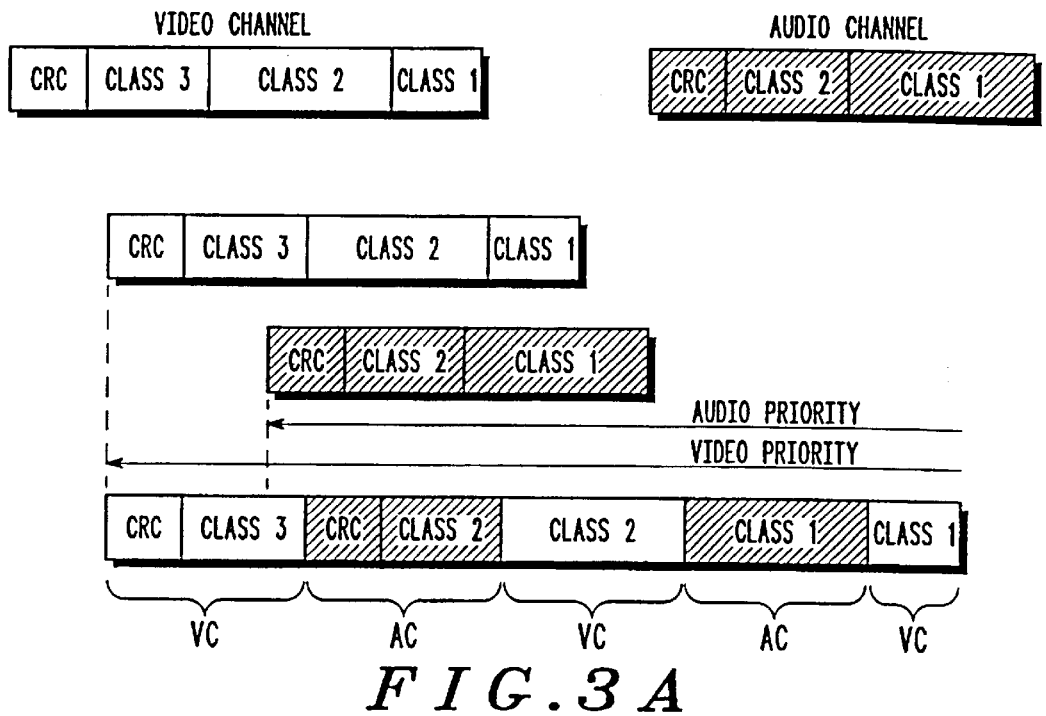
FIG. 3A shows one scheme for mapping bits from two sources into a data structure in accordance with the present invention.
Figure 3B:
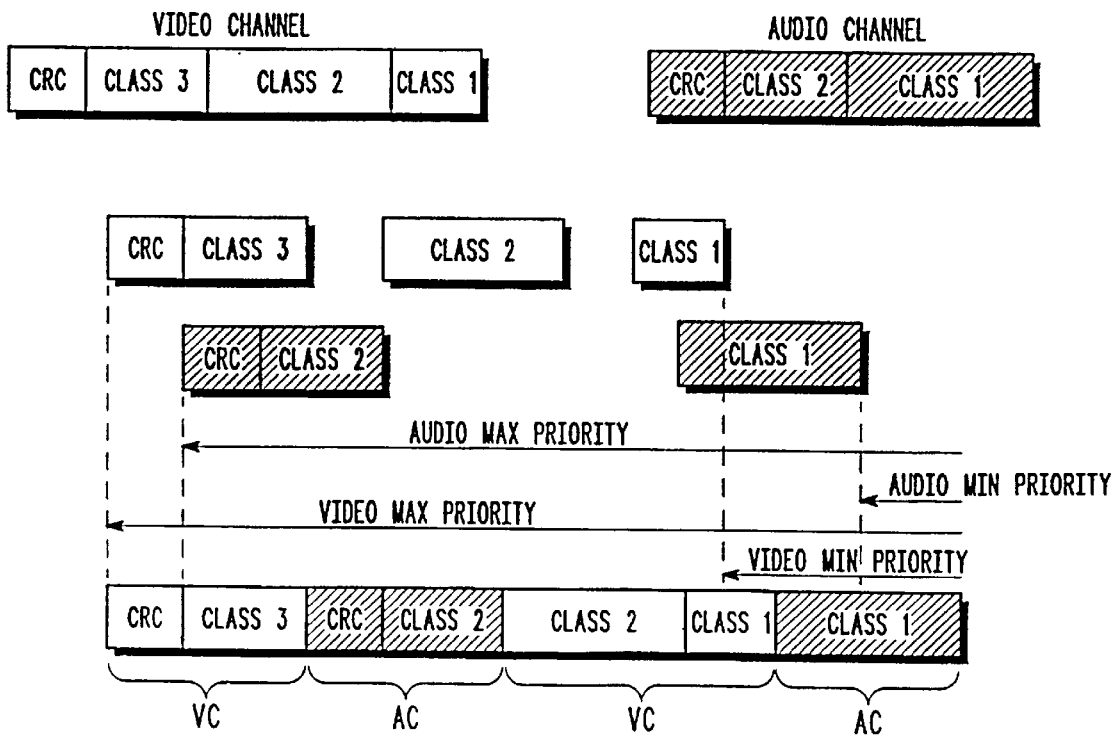
FIG. 3B shows a second scheme for mapping bits from two sources into a data structure in accordance with the present invention.

According to the arrangement shown in FIG. 3A, a single number may be used to define the priority of each logical channel. The two channels, one video and the other audio, and their classes of data are shown in the top row of the figure. The classes of each channel are then shown again in the central section of the figure, offset from the right edge of the figure by an amount dependent on the priority of the channel. Finally, the lower row of the figure shows the data structure D resulting from the multiplexing of the classes from the two channels.

In the case shown, the ordering within the data structure is a simple shuffling of the various classes. In this example the CRC bits for each channel have been appended to the left edge of the data of the highest class of that channel. So the CRC bits of the video channel are appended to the class 3 bits of that channel. Except for this combination containing the CRC bits, in the example of FIG. 3A the left edge of each class defines which class obtains greater priority between different channels.

Looking beyond the example of FIG. 3A, the CRC bits may have greater or lesser importance than the source's highest class of data, depending on the source involved.

In the arrangement of FIG. 3B, an alternative to FIG. 3A is shown. In this arrangement, the same two channels with the same classes are shown at the top of the figure. The channel priorities are now defined with two numbers, one a maximum and the other a minimum. This technique allows the classes within each channel to be spread across the global ordering, between the given maximum and minimum priorities. The two channels are shown again in the middle of the figure, offset from the right edge. This time the priority varies over the classes within each channel, and the classes are thus spread out between the "Max. Priority" and "Min. Priority" points for each channel.

This arrangement would be useful in the case where the highest priority class of one channel is more important than that of another channel but its lowest priority class is less important. The arrangement of FIG. 3B in fact divides up the same classes of data from the same channels as shown in FIG. 3A, but results in a different data structure D.

Alternatively and not illustrated in the figures, the classes may have individual mappings of channel class to global class.

Considering now the data structure D which results from the multiplexing, the data structure receives the various classes mapped from the different sources. This data structure is illustrated in FIG. 1 as the line of classes P+, P, P−1, P−2 . . . 1. The data structure has a header containing the framing information, which is placed in the highest class. This class is denoted as P+ in FIG. 1. The header information is critical, and hence must be heavily protected. Corruption in this header would mean that the structure of the multiplex data unit would be unknown and hence be unusable. The data structure as illustrated has decreasing priorities of data from left to right.

Following mapping of the data bits into the data structure D, the bits from the global ordering are then placed into frames. These are preferably FEC data frames for FEC encoding. The prioritisation given to the data in the multiplexing step should be maintained during creation of these frames. The FEC data frames should support differential protection of the different classes of bits. RCPC techniques are an obvious candidate for this framing, although clearly other techniques may be used.

The relative prioritisation of the data is preserved during the sub-division of the data from the data structure (D) into these FEC frames. The mapping of bits into the FEC (RCPC) frames uses a simple algorithm where the most protected parts (outer most parts of an RCPC frame) of the frames are filled first, working from the most important bits in the global ordering (class P+) to the least important (class 1), left to right in FIG. 1. This algorithm meets the requirement that the class P+ bits should be placed in the most protected parts of the first frame to minimise buffering requirements and delay. Some bits may be left unprotected (class 2 and 1 in FIG. 1). These bits may be insensitive parameters of a source coding method or perhaps bits with unconstrained delay requirements using an ARQ type scheme to ensure eventual correct data transmission.

The data frames are then encoded for transmission. In the preferred embodiment, FEC encoding is used. In the case of RCPC encoding, the data is also punctured, all whilst preserving the relative prioritisation of the data. The data may then be transmitted. Interleaving may also be applied to improve the performance over bursty channels.

A recipient of the data must be able to convert the data back to the format in which it was originally transmitted. The data then regains the format and meaning which it originally possessed when it was produced by the original source Si from which it came. The invention therefore also extends to a method of decoding and of de-multiplexing data.

The decoding is the reverse of the encoding process. Knowledge of the multiplex framing, channel definitions and details of the FEC scheme are assumed to be present at both the encoder and decoder. The method of decoding and de-multiplexing data which has been encoded in accordance with the method steps outlined above involves decoding the data into frames and then de-multiplexing the data back to the format of the sources from which it originated. This de-multiplexing of data involves the de-multiplexing of data which has been multiplexed as outlined above. In accordance with this de-multiplexing, the reverse of the multiplexing steps given above are performed, preferably on data which has been received by a user after transmission and de-coding. The de-multiplexing converts the data back to the format of the sources from which it originated.

The methods of the present invention can clearly be implemented using a variety of circuitry, suitably adapted to be able to perform the method steps given above. Although not limited to such hardware, suitable circuits for the performance of the invention would be a suitably programmed microcontroller or an application specific integrated circuit specifically constructed to perform the steps of the particular method.

Embodiment with an Adaptive FEC Rate Scheme

A further enhancement of the basic invention is to adapt the FEC protection scheme used. This adaptation may be in response either to changes in the data throughput, changes in the quality of the radio channel used for transmission or changes in the channel bandwidth (e.g. numbers of TDMA slots) available.

Figure 4:
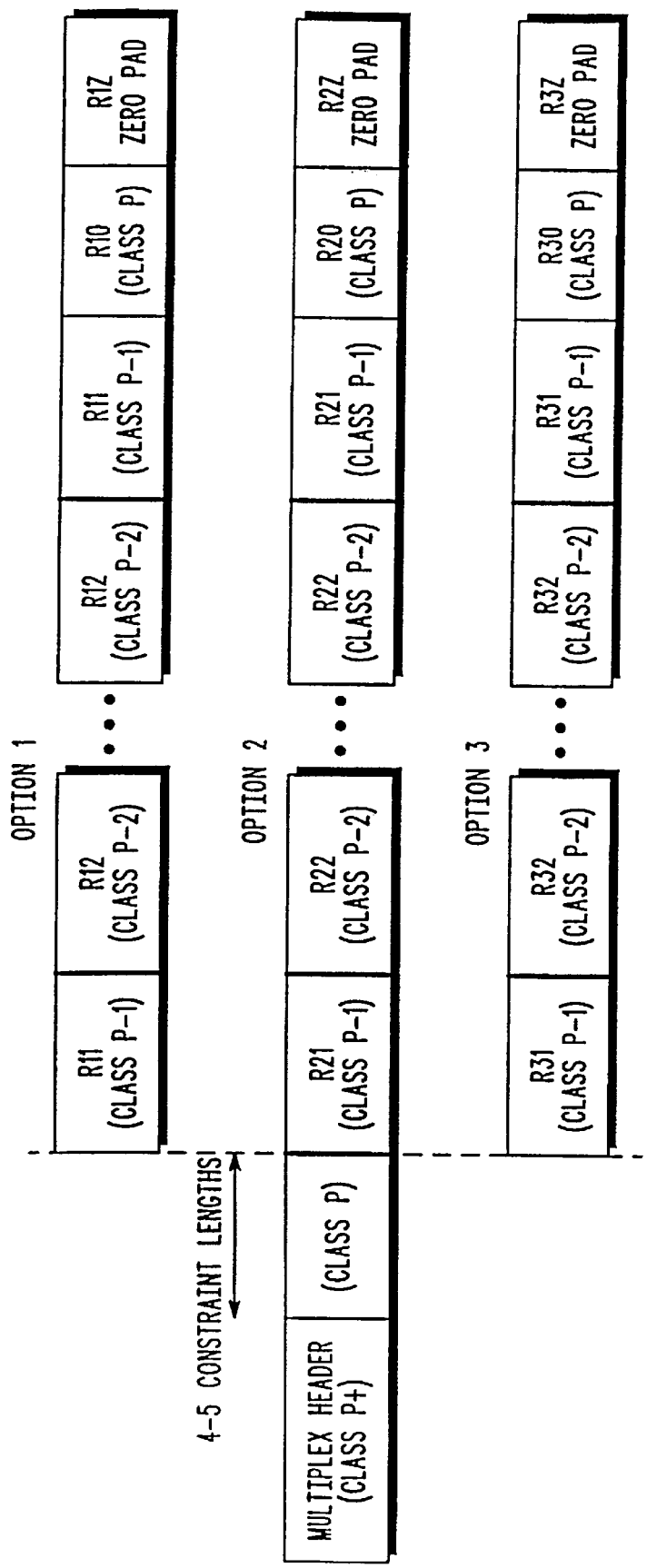
FIG. 4 shows an example of adaptation of the FEC protection scheme to changes in the data throughput.

For RCPC, the simplest approach would be to adapt the puncturing between output multiplex data units, with the change in puncture pattern being communicated to the receiver. In order to minimise the complexity in FEC decoding of the RCPC frames, it may be desirable to encode the multiplex header at the same rate under all circumstances at the start of an RCPC frame and then vary the puncturing pattern for bits beyond a certain point in the RCPC frame (see FIG. 4), normally 4–5 constraint lengths of the parent convolutional code.

What is claimed is:

1. A method of preparing multimedia data for transmission comprising:

multiplexing data from a plurality of sources (S1, . . . Si, . . . Sn), the multiplexing comprising, for each source (Si), classifying the data from the source (Si) into two or more classes (C1, . . . Cj, . . . Cm) according to the priority of the data, and mapping data from the sources into positions in a data structure (D) according both to the class (Cj) of the data and to a further priority assigned to the source (Si) from which the data originated, the division of data into classes (C1, . . . Cj, . . . Cm) and/or the prioritisation of the sources (S1, . . . Si, . . . Sn) being done according to the potential impact of transmission errors on the data; and sub-dividing the data in the data structure (D) into frames whilst preserving the relative prioritisation of the data.

2. The method of claim 1 further comprising: performing forward error correction (FEC) encoding on the data frames whilst preserving the relative prioritisation of the data.

3. A method according to claim 1 in which the division of data into classes (C1, . . . Cj, . . . Cm) and/or the prioritisation of the sources (S1, . . . Si, . . . Sn) is done according respectively to the importance of the data and the importance of the source to the recipient(s) of the data.

4. The method of claim 2, wherein the data is firstly decoded into frames, then the data frames are re-constituted into a data structure (D), and finally the data is de-multiplexed back to the format of the sources (S1, . . . Si, . . . Sn) from which it originated.

5. The method of claim 3, wherein the data is firstly decoded into frames, then the data frames are re-constituted into a data structure (D), and finally the data is de-multiplexed back into the formal of the sources (Si, . . . Si, . . . Sn) from which it originated.

6. A method of preparing multimedia data for transmission comprising:

multiplexing data from a plurality of sources (S1, . . . Si, . . . Sn), the multiplexing comprising, for each source (Si), classifying the data from the source (Si) into two or more classes (C1, ... Cj, ... Cm) according to the priority of the data, and mapping data from the sources into positions in a data structure (D) according both to the class (Cj) of the data and to a further priority assigned to the source (Si) from which the data originated, the division of data into classes (C1, ... Cj, ... Cm) and/or the prioritisation of the sources (S1, ... Si, ... Sn) being done according to the potential impact of transmission errors on the data;

sub-dividing the data in the data structure (D) into frames whilst preserving the relative prioritisation of the data; and performing forward error correction (FEC) encoding on the data frames, supporting differential protection of the different classes (C1, ... Cj, ... Cm) of bits whilst preserving the relative prioritisation of the data.

7. A method of preparing multimedia data for transmission comprising:

multiplexing data from a plurality of sources (S1, ... Si, ... Sn) that may have different data rates and formats, the multiplexing comprising, for each source (Si), classifying the data from the source (Si) into two or more classes (C1, ... Cj, ... Cm) according to the priority of the data, and mapping data from the sources into positions in a data structure (D) according both to the class (Cj) of the data and to a further priority assigned to the source (Si) from which the data originated, the division of data into classes (C1, ... Cj, ... Cm) and/or the prioritisation of the sources (S1, ... Si, ... Sn) being done according to the potential impact of transmission errors on the data; and sub-dividing the data in the data structure (D) into frames whilst preserving the relative prioritisation of the data.

8. A method according to claim 2 in which the division of data into classes (C1, ... Cj, ... ,Cm) and/or the prioritisation of the sources (S1, ... Si, ... Sn) is done according respectively to the importance of the data and the importance of the source to the recipient(s) of the data.

9. The method of claim 8, wherein the data is firstly decoded into frames, then the data frames are re-constituted into a data structure (D), and finally the data is de-multiplexed back into the format of the sources (S1, ... Si, ... Sn) from which it originated.

* * * * *